H. L. Gockley,
Hay Loader.
No. 107,038.  Patented Sep. 6, 1870.
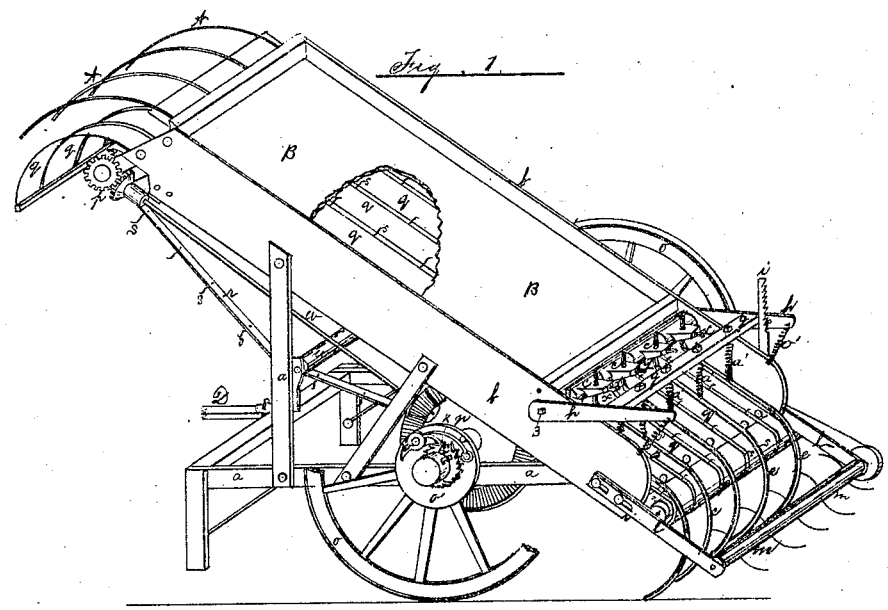
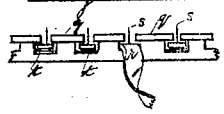
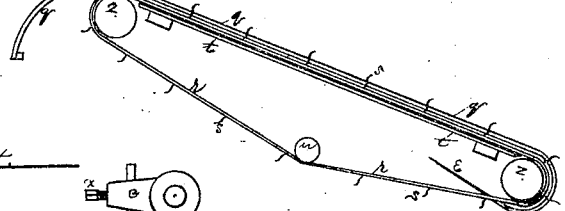
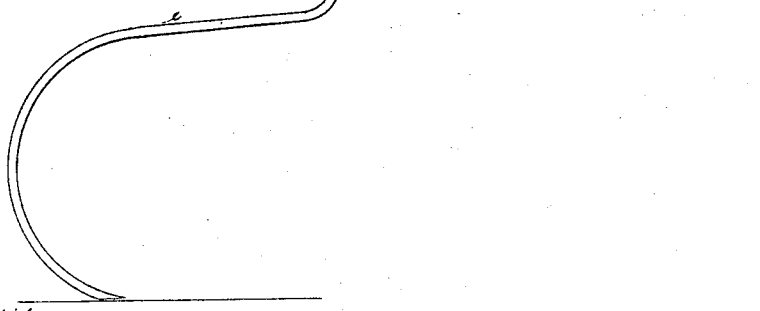
Witnesses  
Thos. H. Hutchins  
H. Lowe  
Inventor  
Henry L. Gockley

United States Patent Office.

HENRY L. GOCKLEY, OF JACKSON, ILLINOIS.

Letters Patent No. 107,038, dated September 6, 1870.

IMPROVEMENT IN HAY-LOADER.

The Schedule referred to in these Letters Patent and making part of the same

Be it known that I, HENRY L. GOCKLEY, of the town of Jackson, in Will county, and State of Illinois, have invented a new and useful Improvement on a Hay-Rake and Loader; and I do hereby declare the following to be a full, clear, and exact description of the same, reference being had to the annexed drawing, in which—

Figure 1 is a perspective view;

Figure 3, a cross-sectional view of a part of the straw-carrier floor;

Figure 2, a longitudinal sectional view of the straw-carrier floor; and

Figure 4, a side elevation of one of the rake-teeth and its oscillating box.

My invention relates to that class of hay-rakes which attach to the rear end of a wagon, and, as it moves over the ground, rakes up the hay and deposits it on the wagon, the construction and operation of which I will proceed to explain.

$a$ is the main frame, supported on the two traveling wheels, $o$ $o$.

$b$ $b$ are the sides of the straw-carrier.

The lower or rear end of the machine is furnished with two rakes, as shown in fig. 1, $e$ being the rake that takes the straw from the ground, and $m$ an auxiliary revolving rake, attached to the machine by means of the projecting slotted arms $l$, for the purpose of assisting the straw up onto the straw-carrier, as the straw will frequently choke up and clog at that particular point.

The floor of the straw-carrier is constructed of a double row of slats, $q$ and $t$, arranged with respect to each other as shown in fig. 3, so the toothed elevating belts $r$ slide on the slats $t$, while the teeth $s$ pass up between the upper slats $q$, as shown in figs. 1 and 3, far enough to catch the straw and carry it forward without the belts coming in contact with the straw, by means of which they are kept exactly in place, and do not wear out so readily.

The slats $q$ project far enough from the upper end so as to take the straw away from the machine, while the lower end terminates in the guide-points E, between which the belts $r$ are guided to their proper location on the lower roller $z$.

B is a cover, between which and the slats $q$ the straw passes up, which keeps the straw down so it will engage with the teeth $s$, and so the wind will not blow it off the machine.

$u$ is an adjustable roller resting on the bands $r$ for the purpose of giving them the proper tension, so they will not slip on the driving-roller 2.

Motion is imparted to the belts $r$ by means of the pinion $n$ on the axle of the wheels $o$; from thence, by means of the shaft $w$, to the bevel-pinion $p$ at the top of the machine, on the end of the roller 2.

A A are teeth attached to the cover B to hold the straw in place until finally discharged.

Figure 4 shows the manner of attaching the rake-teeth $e$ to the machine.

Each tooth is attached to an oscillating box, $c$, on the rod 3, fig. 1, passing through and across the machine, as shown, and are entirely independent of each other, so they will move up and down to pass over obstructions without interfering with each other.

Each tooth is held in the box $c$ by a set-screw, $x$, so, if one should break, another could easily be inserted.

Across the rake $e$ is the cross-bar $g$, attached to the oscillating arms $h$, which are held down on the outer end by the spiral springs $o'$.

Each tooth is held down to its work by means of the spiral springs $a'$, pendent from the cross-bar $g$.

A greater or lesser pressure of the springs $a'$ is effected by raising or lowering the arms $h$ by means of the notched pawl $i$, as shown in fig. 1.

The machine attaches to the rear end of the wagon by means of the reach D, and, as it is drawn over the field, gathers up the hay by means of the rake $e$, carries it up, and discharges it from the upper end onto the hay-rack on the wagon, thus saving the time and trouble of raking up and putting it in cocks, as in the ordinary way.

Claim.

Having thus described my invention,

What I claim as new, and desire to secure by Letters Patent, is—

The arrangement of main frame $a$, carrier-floor $q$ $t$, toothed belt $r$, rake $c$ $e$, arms $h$, notched pawl $i$, cross-bar $g$, springs $a'$ $o'$, and revolving rake $m$, all constructed and operated substantially as and for the purpose set forth.

HENRY L. GOCKLEY.

Witnesses:
THOS. H. HUTCHINS,
H. LOWE.